(12) United States Patent
Vitale et al.

(10) Patent No.: US 8,070,979 B2
(45) Date of Patent: Dec. 6, 2011

(54) CHEMICAL METHOD FOR SOIL IMPROVEMENT

(75) Inventors: Robert W. Vitale, Canton, OH (US); Todd R. Hawkins, Massillon, OH (US); C. David Brangan, Anchorage, AK (US)

(73) Assignee: Midwest Industrial Supply, Inc., Canton, OH (US)

( * ) Notice: Subject to any disclaimer, the term of this patent is extended or adjusted under 35 U.S.C. 154(b) by 0 days.

(21) Appl. No.: 13/117,547

(22) Filed: May 27, 2011

(65) Prior Publication Data
US 2011/0229269 A1 Sep. 22, 2011

Related U.S. Application Data

(62) Division of application No. 12/696,550, filed on Jan. 29, 2010, now Pat. No. 8,048,333.

(51) Int. Cl.
*C09K 3/22* (2006.01)
*C05C 1/00* (2006.01)

(52) U.S. Cl. .......................... 252/88.1; 71/27

(58) Field of Classification Search .................. None
See application file for complete search history.

(56) References Cited

U.S. PATENT DOCUMENTS

| | | |
|---|---|---|
| 3,640,696 A | 2/1972 | Goldmann |
| 3,651,649 A | 3/1972 | Najvar et al. |
| 3,690,107 A | 9/1972 | Dolfing et al. |
| 3,705,467 A | 12/1972 | McKnight |
| 3,887,506 A | 6/1975 | Hewitt |
| 4,106,296 A | 8/1978 | Leonard, Jr. et al. |
| 4,129,435 A | 12/1978 | Takematsu et al. |
| 4,218,234 A | 8/1980 | Nadasy et al. |
| 4,252,556 A | 2/1981 | Nadasy et al. |
| 4,268,428 A | 5/1981 | Green |
| 4,417,992 A | 11/1983 | Bhattacharyya et al. |
| 4,592,931 A | 6/1986 | Cargle |
| 4,650,820 A | 3/1987 | Decroix |
| 4,822,425 A | 4/1989 | Burch |
| 5,013,349 A | 5/1991 | Tanaka |
| 5,082,500 A | 1/1992 | Nachtman et al. |
| 5,112,902 A | 5/1992 | Moriya et al. |
| 5,178,668 A | 1/1993 | Traver et al. |
| 5,595,782 A | 1/1997 | Cole |
| 5,648,116 A | 7/1997 | Roe et al. |
| 5,712,316 A | 1/1998 | Dahmen et al. |
| 5,733,576 A | 3/1998 | Chmelir |

(Continued)

FOREIGN PATENT DOCUMENTS
EP 0 467 073 1/1992
(Continued)

OTHER PUBLICATIONS

Rohmax Additives GmbH, "Viscoplex 1-180," Data Sheet, Jul. 2004, www.rohmax.com.

(Continued)

*Primary Examiner* — Necholus Ogden, Jr.
(74) *Attorney, Agent, or Firm* — Daniel A. Thomson; Emerson, Thomson Bennett, LLC

(57) ABSTRACT

A method for providing soil improvement to a particulate surface soil including applying to and allowing to penetrate the associated surface soil a composition comprising a synthetic fluid and a binder and applying as a second surface a synthetic fluid, a binder, and synthetic fibers.

20 Claims, 2 Drawing Sheets

U.S. PATENT DOCUMENTS

| | | | |
|---|---|---|---|
| 5,824,725 | A | 10/1998 | Lahalih |
| 5,846,601 | A | 12/1998 | Ritter et al. |
| 5,860,770 | A | 1/1999 | Hunt |
| 5,997,599 | A | 12/1999 | Wommack et al. |
| 6,060,557 | A | 5/2000 | Dahmen et al. |
| 6,076,997 | A | 6/2000 | First et al. |
| 6,132,638 | A | 10/2000 | Oldenhove |
| 6,325,836 | B1 | 12/2001 | Wommack et al. |
| 6,349,499 | B1 | 2/2002 | Spittle |
| 6,403,700 | B1 | 6/2002 | Dahmen et al. |
| 6,503,521 | B1 | 1/2003 | Atis et al. |
| 6,695,545 | B2 | 2/2004 | Boston |
| 6,729,805 | B2 | 5/2004 | Wathen |
| 6,750,262 | B1 | 6/2004 | Hahnle et al. |
| 6,759,453 | B2 | 7/2004 | Jelling et al. |
| 6,982,291 | B2 | 1/2006 | Desin |
| 7,001,444 | B2 | 2/2006 | Small |
| 7,026,390 | B2 | 4/2006 | O'Brien-Bernini et al. |
| 7,070,709 | B2 | 7/2006 | Schilling et al. |
| 7,074,266 | B2 | 7/2006 | Hawkins et al. |
| 7,134,806 | B2 | 11/2006 | Lazic |
| 7,207,744 | B2 | 4/2007 | Jones, IV et al. |
| 7,285,515 | B2 | 10/2007 | Goncalves et al. |
| 7,514,018 | B2 | 4/2009 | Schilling et al. |
| 7,651,294 | B2 | 1/2010 | Maier |
| 2004/0011102 | A1 | 1/2004 | Sears |
| 2004/0035162 | A1 | 2/2004 | Williams et al. |
| 2004/0074271 | A1* | 4/2004 | Krysiak et al. .......... 71/27 |
| 2004/0234682 | A1 | 11/2004 | Hawkins et al. |
| 2004/0245494 | A1 | 12/2004 | Horman et al. |
| 2004/0260017 | A1 | 12/2004 | Mertens et al. |
| 2005/0090401 | A1 | 4/2005 | Sakane et al. |
| 2005/0124527 | A1 | 6/2005 | Hawkins et al. |
| 2005/0150417 | A1 | 7/2005 | Hirsbrunner et al. |
| 2006/0048670 | A1 | 3/2006 | Al-Rashed |
| 2006/0075928 | A1 | 4/2006 | Richards et al. |
| 2006/0128839 | A1 | 6/2006 | Ferrall et al. |
| 2006/0156961 | A1 | 7/2006 | Langford |
| 2007/0135561 | A1 | 6/2007 | Rath et al. |
| 2007/0286903 | A1 | 12/2007 | Becicka et al. |
| 2008/0028890 | A1 | 2/2008 | Hey et al. |
| 2008/0087305 | A1 | 4/2008 | Cotter |
| 2008/0185160 | A1 | 8/2008 | Diener et al. |
| 2009/0090890 | A1 | 4/2009 | Hguyen |
| 2009/0169901 | A1 | 7/2009 | Blacklidge |
| 2009/0189113 | A1 | 7/2009 | Lamperd et al. |
| 2009/0211491 | A1 | 8/2009 | Ogata et al. |
| 2009/0301302 | A1 | 12/2009 | Weatherman et al. |
| 2009/0301863 | A1 | 12/2009 | Swanson, Jr. et al. |
| 2009/0318602 | A1 | 12/2009 | Deneuvillers |
| 2010/0047015 | A1 | 2/2010 | Takamura et al. |
| 2010/0075029 | A1 | 3/2010 | Wilson, Jr. |
| 2010/0112329 | A1 | 5/2010 | Yi |

FOREIGN PATENT DOCUMENTS

| | | |
|---|---|---|
| EP | 1 112 324 | 10/2005 |
| EP | 2 083 121 | 7/2009 |
| GB | 2 142 552 | 1/1985 |
| JP | 49 7899 | 2/1974 |
| JP | 04 142390 | 5/1992 |
| JP | 07 042210 | 5/1995 |
| JP | 2109781 | 11/1996 |
| KR | 10 2000 0060661 | 10/2000 |
| WO | 00 15715 | 3/2000 |
| WO | 2006 041581 | 4/2006 |
| WO | 2006 068467 | 6/2006 |
| WO | 2008 011368 | 1/2008 |
| WO | 2008 070234 | 6/2008 |
| WO | 2009 137299 | 11/2009 |
| WO | 2010 025518 | 3/2010 |

OTHER PUBLICATIONS

Rohmax Additives GmbH, "Viscoplex 10-131," Data Sheet, Jul. 2004, www.rohmax.com.

Geotechnical Laboratory of Advanced Geotechnical Testing AGT, LLC, "Kipnik Soil Evaluation Stabilized Sub-Grade Apron Development," AGT Project No. 3407159, Sep. 2007.

University of Alaska Fairbanks, Hazirbaba, Connor, Davis, Zhang, "Final Report: The Use of Geofiber and Synthetic Fluid for Stabilizing Marginal Soils," INE Project No. RR07.03, Oct. 1, 2007.

Tracey, Tsou, "Dynamically Vulcanized Alloy Innerliners," Rubber World Magazine, ISSN 0035-9572, Sep. 1, 2007.

University of Alaska Fairbanks, Misc. Authors, Newsletter vol. 1, No. 2, Feb. 2008.

Wacker Silicones, "Drysoil in Landscaping Application, Creating Tomorrow's Solutions", Apr. 1, 2008.

Copeland, Eisele, Chesney, Kawatra, "Factors Influencing Dust Suppressant Effectiveness," Minerals & Metallurgical Processing, 25(4): 215-222 Nov. 2008.

Kavouras, Etyemezian, Nikolich, Gilles, Sweeney, Young, Shafer, "A New Technique for Characterizing the Efficacy of Fugitive Dust Suppressants," Journal of the Air & Waste Management Association, 59 (5): 603-612 May 2009.

Edvardsson, "Gravel Roads and Dust Suppression," Road Materials and Pavement Design, 10(3): 439-469 Jul.-Sep. 2009.

Goodrich, Koski, Jacobi, "Monitoring Surface Water Chemistry Near Magnesium Chloride Dust Suppressant Treated Roads in Colorado," Journal of Environmental Quality, 38(6): 2373-2381 Nov.-Dec. 2009.

Marais, Thompson, Visser, "Managing Mine Road Maintenance Interventions Using Mine Truck On-Board Data," The Southern African Institute of Mining and Metallurgy, Surface Mining 2008.

Thompson, Visser, Van Den Bert, Bosch, "Towards a Mechanistic Structural Design Method for Surface Mine Haul Roads," Journal of the South African Institution of Civil Engineers, vol. 38, No. 2, Second Quarter 1996, pp. 13-21.

Thompson, Visser, "Mine Haul Road Fugitive Dust Emission and Exposure Characterisation," unknown publication, Jan. 2001.

Thompson, Visser, "Benchmarking and Managing Surface Mine Haul Road Fugitive Dust Emissions," unknown publication, Mar. 2002.

Hugo, Heyns, Thompson, Visser, "Haul Road Condition Monitoring using Vehicle Response Measurements," ICSV, Jul. 2005.

Liu, J., Shi,B.,Jiang, H., Bae, S., Huang, H., "Improvement of Water-Stability of Clay Aggregates Admixed with Aqueous Polymer Soil Stabilizers" Catena, vol. 77, Issue 3, Jun. 15, 2009, p. 175-179.

Thompson, Visser, "The Impact of Rolling Resistance on Fuel, Speed and Costs," HME 2006: Continuous Improvement Case Studies, 2006.

Thompson, Visser, "Selection and Maintenance of Mine Haul Road Wearing Course Materials," Mining Technology, 2006, vol. 115, No. 4, pp. 140-153.

Thompson, Visser, "Selection Performance and Economic Evaluation of Dust Palliatives on Surface Mine Haul Roads," The Journal of the Southern African Institute of Mining and Metallurgy, vol. 107, Jul. 2007, pp. 1-16.

Thompson, Visser, "Final Project Report COL467: The Reduction of the Safety and Health Risk Associated with the Generation of Dust on Strip Coal Mine Haul Roads," University Pretoria, Departments of Mining and Civil Engineering, Jan. 2000.

Edil, Benson, "Sustainable Construction Case History: Fly Ash Stabilization of Road-Surface Gravel," University of Wisconsin-Madison, Geological Engineering Program, Dept. of Civil and Environmental Engineering, 2007 World of Coal Ash (WOCA), May 7-10, 2007.

* cited by examiner

CHEMICAL METHOD FOR SOIL IMPROVEMENT

This application is a divisional patent application of Ser. No. 12/696,550, filed Jan. 29, 2010, entitled CHEMICAL METHOD FOR SOIL IMPROVEMENT, which claims priority to Ser. No. 61/148,216, filed Jan. 29, 2010, and Ser. No. 61/297,843, filed Jan. 25, 2010, the contents of which are hereby incorporated by reference.

I. BACKGROUND

1. Technical Field

This invention relates to a method of soil improvement and dust control utilizing synthetic fluids and other non-synthetic base oils and various combinations of polyisobutylene, carboxylic acids, pour point depressants, esters, soil/ash, biodegradable fibers, wood chips, and/or synthetic fibers.

2. Background

Many methods of chemical dust and erosion control, and soil stabilization have been utilized over the years, with various detrimental effects on environment, health, and safety and varying degrees of success. Traditional products used for dust control and soil stabilization consist of used or recycled oil, virgin oils, chlorides, lignins, and emulsifications made with low-grade petroleum resins, asphalt, oil, and pitch.

The use of used or recycled petroleum oils has long been employed as a dust control agent. In recent years legislation by most states has curtailed the use of these oils for dust control because of concerns with environment, health, and safety. This legislation has spawned an interest in virgin oils, some highly refined and very safe. The highly refined products may contain low or no aromatics but are generally cost prohibitive for most applications. In addition, petroleum oils have limited value as dust suppressants and virtually no value as soil stabilizers. They act as particle weighting agents by the processes of adsorption or absorption and do not have any significant cohesive action for soil stabilization and control of fine dust.

Magnesium chloride, calcium chloride, and sodium chloride used in solution or solid form act as humectants when added to soil. These products work well in areas of sufficient moisture or require watering for humectants action. The problems with these products are their solubility in water and effects on ground water and plant life. In addition, as strong electrolytes they are highly corrosive to metal equipment.

Lignins have been employed as a low-cost means of dust control for several decades. Recently lignins have come under considerable attack by environmental, health, and safety organizations that have identified dioxin and dioxin forming compositions in lignin This problem is compounded by lignins solubility in water and its ability to contaminate ground water. Lignins also have a limited working life because they are water soluble they tend to be washed away with rain, melting snow, or other moisture.

Many types of emulsions of tall oil, petroleum resins, and asphalts and combinations can be prepared and have been exhibited in prior art. Typically these products are emulsified to reduce viscosity to sprayable levels and to aid in penetration of the product into the soil. One of the problems created is the use of excess liquid, which is sprayed onto the ground and can migrate into ground water. In addition, emulsions can also be severely damaged by rain and moisture when the moisture event occurs prior to the emulsion breaking and the active ingredients curing. When cured properly these products produce a bound soil layer, which is effective for dust control for short periods and under conditions where there is little mechanical disturbance. Examples of tall oil pitch emulsions that produce these results can be found in prior art. Doyle U.S. Pat. No. 5,895,347 discloses chemically stabilized emulsions of tall oil pitch, hydrochloric and stearic acids, and emulsifiers in water where temperature and pH are controlled during preparation. Additionally, Burch U.S. Pat. No. 4,822,425 discloses an emulsion comprising tall oil pitch, rosin, emulsifier, and water.

Different soil types are classified under the Unified Soil Classification System (USCS) with a two letter code. The first letter choices are G—gravel, S—sand, M—silt, C—clay, O—organic, and the second letter choices are P—poorly graded, W—well graded, H—high plasticity, L—low plasticity. The group symbols are GW, GP, GM, GC, SW, SP, SM, SC, ML, CL, OL, MH, CH, and OH.

Binders are defined as additives to the material being agglomerated that produce bonding strength in the final product. A binder can be a liquid or solid that forms a bridge, film, or matrix filler or that causes a chemical reaction. Binders can be classified into four types. The first type is a matrix binder which is a solid or semi-solid, such as tar, pitch, asphalt, wax, or cement. Another type is a film binder, which includes water, solutions, dispersions, powders, silicate, gel, oil, alcohol, clay, and starch. The third type is a chemical binder, which reacts chemically with the material being agglomerated; these include silicate, acid molasses, lime, and lignosulphonate. The fourth type is a lubricant, which is used to reduce friction and induce flow of the material. Lubricants include oil, glycerin, stearate, and wax.

II. SUMMARY

Accordingly, several objects and advantages of our invention are superior dust control and soil improvement in areas of intense use and/or cold ground. Improved air and water quality through reduction of airborne particulates and soil erosion are achieved with use of our chemical agents formulated from safe aliphatic and cyclic organic compositions.

In addition, our invention has several benefits over traditional chemical dust and erosion control, and soil improvement agents, it can be applied neat or undiluted eliminating the chances of collateral runoff, it remains active over long periods of time requiring fewer maintenance applications, is insoluble in water resisting rain and inclement weather contains no electrolytes thus inhibits corrosion.

A heterogeneous mixture produced by blending aliphatic or cyclic organic compositions with carboxylic acids of chemical structure R—COOH and applied to soils in a manner to produce high levels of dust control and soil stabilization. The aliphatic and cyclic compositions act as plasticizers and carriers for the carboxylic acids. When applied to soil the carrier provides a mechanism for the carboxylic acid to penetrate the soil and also acts as a dust suppressing weighting agent. The plasticized carboxylic acid provides a durable, reworkable binder that associates small particulates while stabilizing soil and aggregate. The chemical agent is manufactured and applied using conventional mixing and applied using conventional construction equipment.

The present invention also encompasses a heterogeneous mixture produced by blending aliphatic or cyclic organic compositions with polyolefins of chemical structure $C_nH_{2n}$ or $R-C_{2n}H_{3n}$, and applied to soils in a manner to produce high levels of dust control and soil stabilization. The aliphatic and cyclic compositions act as plasticizers and carriers for the polyolefin to penetrate the soil and also act as a dust suppressing weighting agent. The plasticized polyolefin provides a durable, reworkable binder that associates small particulates while stabilizing soil and aggregate. The chemical agent is manufactured and applied using conventional mixing and applied using conventional construction equipment.

The present invention also incorporates a pour point depressant.

Still further objects and advantages will become apparent from a consideration of the ensuing description and accompanying drawings.

III. DEFINITIONS

Adhesion—the tendency of certain dissimilar molecules to cling together due to attractive forces.

Agglomeration—the process of particle size enlargement in which small, fine particles (such as dusts or powders) are gathered into larger masses, clusters, pellets, or briquettes for use as end products or in secondary processing steps.

Binder—additives to the material being agglomerated that produce bonding strength in the final product.

Bonding—the forces of cohesion between particles, as in agglomerate bonding or bonding strength.

Carboxylic Acid—an organic acids characterized by the presence of a carboxyl group, which has the formula —C(=O)OH, usually written —COOH or —$CO_2H$. Carboxylic acids are Brønsted-Lowry acids—they are proton donors.

Clustering—loose bonding of particles by pendular and funicular bridges in the presence of moisture.

Cohesion—the intermolecular attraction between like-molecules.

Hydrocracking—the elimination of aromatics and polar compounds achieved by chemically reacting the feedstock with hydrogen, in the presence of a catalyst, at high temperatures and pressures.

Hydroisomerization—The isomerization of alkane hydrocarbons via an intermediate alkene.

Lipophilic Fluid—a fluid having an affinity for, tending to combine with, or capable of dissolving in lipids.

Olefin—an unsaturated chemical compound containing at least one carbon-to-carbon double bond (also called an alkene with the general formula $C_nH_{2n}$.

Polyolefin—a polymer produced from a simple olefin as a monomer.

Pour Point Depressant—Pour point depressants (also known as PPDs) are polymers that are designed to control wax crystal formation in lubricants resulting in lower pour point and improved low temperature flow performance.

Synthetic isoalkane—A synthetic alkane with a branched chain whose next-to-last carbon atom is bonded to a single methyl group.

Viscosity Index Improver—a chemical component that increases the viscosity index (a measure for the change of kinematic viscosity with temperature).

III. BRIEF DESCRIPTION OF THE DRAWINGS

At least one embodiment is set forth in the following description and is shown in the drawings and is particularly and distinctly pointed out and set forth in the appended claims.

IV. DETAILED DESCRIPTION

Figure 1:
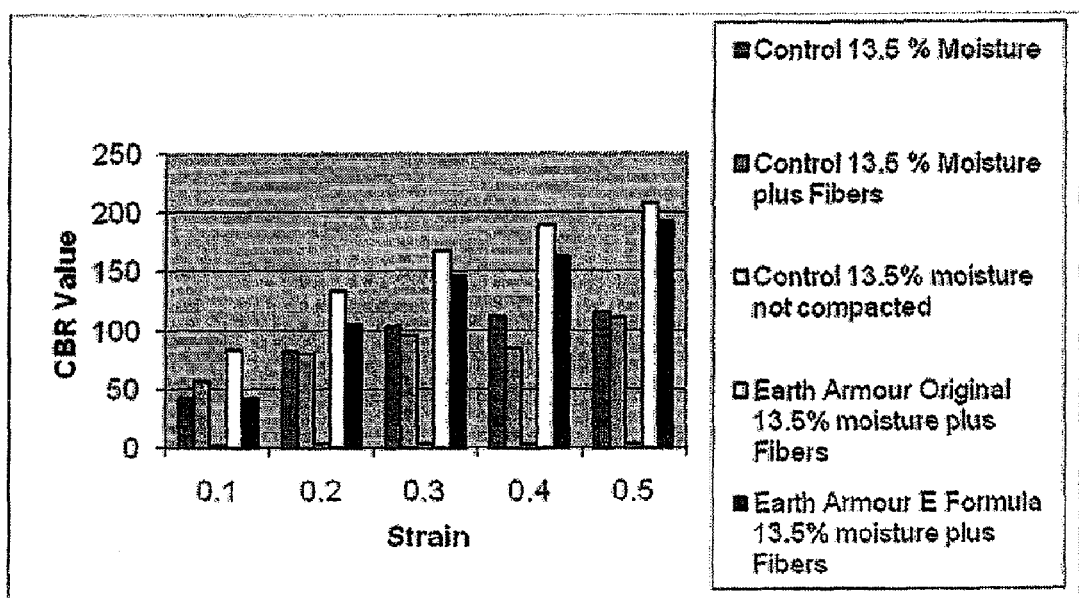
FIG. 1 is a chart showing test results.

In one embodiment of the present invention utilizes a composition for enhancing soil improvement characteristics in cold regions. The liquid soil improvement agent is comprised of a synthetic fluid in combination with a pour point depressant. By "synthetic" it is meant a substance, pure or a mixture, which has undergone at least one major chemical transformation (reaction) in its manufacture or processing. A simple physical separation, purification, or transformation (i.e. freezing or boiling) does not constitute a major chemical reaction. In one embodiment, the pour point depressant is chosen from acrylic, acrylic copolymer, polymethacrylate, ethylene vinyl acetate copolymers, vinyl acetate olefin copolymers, alkyl esters of styrene-maleic anhydride copolymers, alky esters of unsaturated carboxylic acids, polyalkylacrylates, alkyl phenols, alpha olefin copolymers, and polyakyl methacrylate. Incorporating the synthetic fluid and pour point depressant into soil and compacting it, will increase the soil bearing strength and other mechanical properties. The improvements in compacted soil characteristics can be achieved in cold weather environments at temperatures well below the freezing point of water. Typically, in warmer climates this soil improvement is accomplished by the use of water. This invention has the benefit over traditional methods by virtue of its ability to be dispersed and incorporated into soil at temperatures impossible for use with water due to the freezing point of water. It also remains in situ, gaining strength due to the water proofing ability, protection against freeze thaw, frost heave, and soil binding characteristics of the chemical composition. In one embodiment of the invention, the synthetic fluid is about 98% to about 99.9% by weight (including, but not limited to, 98.0, 98.1, 98.2, 98.3, 98.4, 98.5, 98.6, 98.7, 98.8, 98.9, 99.0, 99.1, 99.2, 99.3, 99.4, 99.5, 99.6, 99.7, 99.8, and 99.9) and the pour point depressant is about 0.01% to about 2% by weight (including, but not limited to, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.51, 1.50, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, and 2.00), and a neutral oil can be added at between about 0.01% to about 2% by weight (including, but not limited to, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.51, 1.50, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, and 2.00). In another embodiment, the synthetic fluid is between about 80% to about 95% by weight (including, but not limited to, 80, 81, 82, 83, 84, 85, 86, 87, 88, 89, 90, 91, 92, 93, 94, and 95), the pour point depressant is between about 0.1% to about 0.9% by weight (including, but not limited to, 0.1, 0.2, 0.3, 0.4, 0.5, 0.6, 0.7, 0.8, and 0.9), a polyolefin is between about 5% to about 20% by weight (including, but not limited to, 5, 6, 7, 8, 9, 10, 11, 12, 13, 14, 15, 16, 17, 18, 19, and 20), and a neutral oil is between about 0.01% to about 0.9% by weight (including, but not limited to, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, and 0.90). In one embodiment, the application of the soil improvement composition does not require any water. The composition is a paraffin-based, hydrophobic, liquid material that can be applied at temperatures down to at least −40° F. (−40° C.). The composition binds and coats all contacted soil, making it water repellant while insuring compaction. The composition makes for a compacted, yet self-healing surface, in case damage at the base course occurs. It is continuously active, therefore facilitating long-term compaction of base and sub-base soils, serving as both a densification and ballasting agent.

In another embodiment of the present invention utilizes a composition for enhancing soil improvement characteristics in cold regions. The liquid soil improvement agent is comprised of a synthetic fluid, that meets EPA (Environmental Protection Agency) standards for offshore drilling, in combination with a pour point depressant. In this embodiment the synthetic fluid is defined as a fluid that meets the EPA standards for offshore drilling, including the static sheer requirement, the sediment requirement, the polyaromatic hydrocarbon requirement, and the toxicity requirement. In one embodiment, the pour point depressant is chosen from acrylic, acrylic copolymer, polymethacrylate, ethylene vinyl acetate copolymers, vinyl acetate olefin copolymers, alkyl esters of styrene-maleic anhydride copolymers, alky esters of unsaturated carboxylic acids, polyalkylacrylates, alkyl phenols, alpha olefin copolymers, and polyakyl methacrylate. Incorporating the synthetic fluid and pour point depressant into soil and compacting it, will increase the soil bearing strength and other mechanical properties. The improvements in compacted soil characteristics can be achieved in cold weather environments at temperatures well below the freezing point of water. Typically, in warmer climates this soil improvement is accomplished by the use of water. This invention has the benefit over traditional methods by virtue of its ability to be dispersed and incorporated into soil at temperatures impossible for use with water due to the freezing point of water. It also remains in situ, gaining strength due to the water proofing ability, protection against freeze thaw, frost heave, and soil binding characteristics of the chemical composition. In one embodiment of the invention, the synthetic fluid is about 98% to about 99.9% by weight (including, but not limited to, 98.0, 98.1, 98.2, 98.3, 98.4, 98.5, 98.6, 98.7, 98.8, 98.9, 99.0, 99.1, 99.2, 99.3, 99.4, 99.5, 99.6, 99.7, 99.8, and 99.9) and the pour point depressant is about 0.01% to about 2% by weight (including, but not limited to, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.51, 1.50, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, and 2.00), and a neutral oil can be added at between about 0.01% to about 2% by weight (including, but not limited to, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.51, 1.50, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, and 2.00). In another embodiment, the synthetic fluid is between about 80% to about 95% by weight (including, but not limited to, 80, 81, 82, 83, 84, 85, 86, 87, 88, 89, 90, 91, 92, 93, 94, and 95), the pour point depressant is between about 0.1% to about 0.9% by weight (including, but not limited to, 0.1, 0.2, 0.3, 0.4, 0.5, 0.6, 0.7, 0.8, and 0.9), a polyolefin is between about 5% to about 20% by weight (including, but not limited to, 5, 6, 7, 8, 9, 10, 11, 12, 13, 14, 15, 16, 17, 18, 19, and 20), and a neutral oil is between about 0.01% to about 0.9% by weight (including, but not limited to, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, and 0.90). In one embodiment, the application of the soil improvement composition does not require any water. The composition is a paraffin-based, hydrophobic, liquid material that can be applied at temperatures down to at least −40° F. (−40° C.). The composition binds and coats all contacted soil, making it water repellant while insuring compaction. The composition makes for a compacted, yet self-healing surface, in case damage at the base course occurs. It is continuously active, therefore facilitating long-term compaction of base and sub-base soils, serving as both a densification and ballasting agent.

With reference now to FIG. 1, a chart is shown with test results, showing strain (0.1 to 0.5 on graph) vs. CBR (California Bearing Ratio) values. The test consists of causing a plunger of standard area to penetrate a soil sample, (this can be in the laboratory or on site). The force (load) required to cause the penetration is plotted against measured penetration, the readings noted at regular time intervals. The chart shows the results, which are reproduced below as Table 1 of tests on a control, a control plus synthetic fibers, a control not compacted, Sample A (which is synthetic fluid and pour point depressant) with synthetic fibers, and Sample B (which is synthetic fluid, pour point depressant, and polyolefin) with synthetic fibers.

TABLE 1

| CBR | Control 13.5% Moisture | Control 13.5% Moisture plus Fibers | Control 13.5% moisture not compacted | Sample A 13.5% moisture plus Fibers | Sample B 13.5% moisture plus Fibers |
|---|---|---|---|---|---|
| 0.1 | 42.43 | 56.99 | 2.5 | 84.03 | 42.84 |
| 0.2 | 83.19 | 80.14 | 3.33 | 134.22 | 105.38 |
| 0.3 | 103.77 | 96.33 | 3.5 | 168.58 | 146.9 |
| 0.4 | 112.31 | 85.73 | 3.44 | 190.08 | 163.13 |
| 0.5 | 116.15 | 111.67 | 3.52 | 208.47 | 192.95 |

Figure 2:
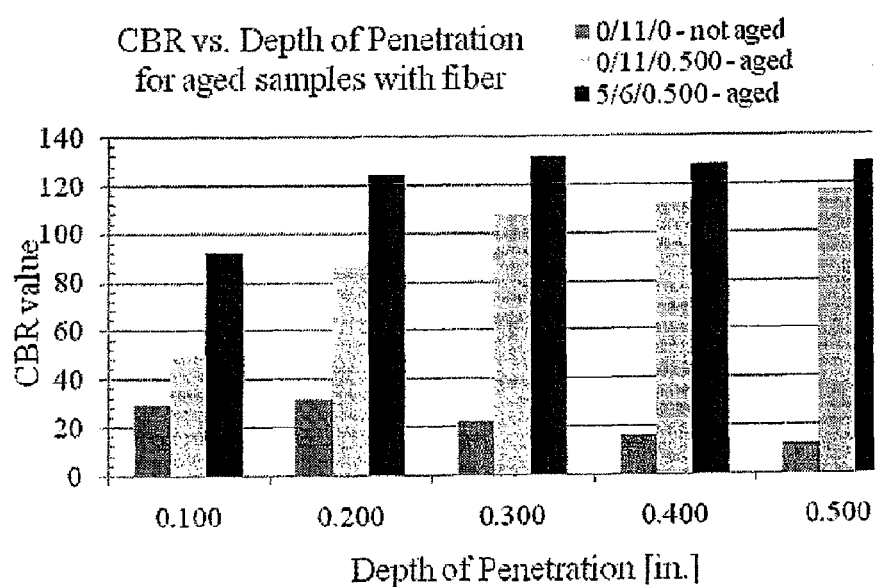
FIG. 2 is a chart showing test results.

This embodiment of the invention, utilizing synthetic fibers, gives the needed cohesion and adhesion to the treated soil, and helps prevent bulging at the heel or toe of the pad. In one embodiment, the synthetic fibers are GeoFibers® from Fiber Reinforced Soils, LLC in Baton Rouge, La. Synthetic fibers, when mixed into soil, open up to produce net, grid, and fiber configurations. These net, grid, and fiber configurations provide a mechanical means for reinforcement of the soil matrix. In this embodiment, the fibers are made of polypropylene, and are between about one-quarter inch and about three inches in length (which includes, but is not limited to 0.25, 0.50, 0.75, 1, 1.25, 1.5, 1.75, 2, 2.25, 2.5, 2.75, and 3 inches), with a tensile strength of about 40,000 psi, a tensile elongation of about 20%, a Young's Modulus of about 600,000 psi, and a specific gravity of about 0.91 gr/cm$^3$. In one embodiment, the fibers have carbon black added as UV protection. Typically, there are three types of fibers: standard tape fibers, fibrillated fibers, and decomposing fibers. In this embodiment, the fibers are added at about 0.15 pounds per square foot (0.072 millibar)-blended uniformly to about 6 inch (15.24 cm) depth and compacted. FIG. 2 shows a graph of the increased CBR values with the present invention.

In another embodiment, synthetic fluid, a pour point depressant, and synthetic fibers are added to soil. The fluid and pour point depressant are about 5% by weight after addition to the soil, and the fibers are between about 0.3% to about 0.5% by weight (including, but not limited to, 0.3, 0.4, and 0.5) after addition to the soil. A treated and an untreated specimen were exposed to three subfreezing temperatures, 25° F. (−3.9° C.), −10° F. (−23° C.), and −30° F. (−34° C.). Measurements were taken at ambient temperatures and after 24 hours of exposure to each temperature. The untreated specimen swelled by 7% volume at 25° F. (−3.9° C.), and no more at the colder temperatures. The treated specimen shrank by 1.5% at 25° F. (−3.9° C.) and did not change at the colder temperatures. It is to be understood that the synthetic fibers can be present in an amount between about 0.1% to about 5% by weight, which includes, but is not limited to 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0. It is also to be understood that in one embodiment, the synthetic fibers can be made of any plastic, elastomer, or rubber.

One method of application is that the fibers are dispersed at a certain ratio per cubic meter, blended into three lifts. The fiber length will be determined by laboratory testing. Fiber dispersing is through mechanical means and monitored for uniformity over the area. Each lift is blended uniformly with the tilling apparatus set to a specific profile. The final lift receives the fluid application along with the fiber as noted. At this point, the treated material is ready for compaction. The synthetic fluid and pour point depressant is applied to the final lift of material at a determined application rate based on the profile. About 50% of the fluid will be applied prior to the fiber application and blending. The remaining 50% is applied prior to compaction. Compaction of the treated material is done with a large compactor. The first pass is with a static roll, with the ensuing passes set for vibratory compaction. CBR values will increase over time as there is a cure time for the synthetic fluid.

In another embodiment, the composition is a synthetic fluid, which in one embodiment is severely hydrotreated synthetic isoalkane and binder, which in one embodiment is polyolefin. The synthetic fluid can be between about 50% to about 95% by weight (which includes, but is not limited to 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) in this embodiment and the binder can be between about 5% and about 50% by weight (which includes, but is not limited to 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50). In one embodiment, the synthetic fluid/binder composition is applied as a sub-base to the soil, and on top of the sub-base, a surface course is applied, which is a combination of the synthetic fluid/binder composition and synthetic fibers. This combination of the sub-base and the surface course allows for strong impact resistance in the soil.

In another embodiment, synthetic fluid is combined with a pour point depressant and a thermoplastic polyolefin compound including: polyisobutylene, polyethylene, polypropylene, polybutenes, polyisoprene, and their copolymers. In another embodiment, the synthetic fluid can be combined with the polyisobutylene without the pour point depressant. It is also to be understood that a binder can be added to any of the embodiments as well. In yet another embodiment, synthetic fluid is combined with pitch rosin blend. Pitch rosin operates as a binder. In all of the above embodiments, the synthetic fluid can be synthetic isoalkane, having an unsaturated hydrocarbon content of less that 1%, a saturate percentage of greater than 99% (although it is to be understood that the saturate percentage can also be 90, 91, 92, 93, 94, 95, 96, 97, 98, or 99%), is either a synthetic or semi-synthetic hydrocarbon, is either a hydrotreated synthetic isoalkane, a hydrocracked synthetic isoalkane, or a hydroisomerized synthetic isoalkane, has a viscosity of at least about 19 centistokes @ 68° F., a flame point greater than about 266° C., and has a flash point of about 350° F. The synthetic fluid combined with polyisobutylene helps give even distribution of the load.

In another embodiment, the composition is a base oil, which in one embodiment is severely hydrotreated synthetic isoalkane and binder, which in one embodiment is polyolefin. The base oil can be between about 50% to about 95% by weight (which includes, but is not limited to 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) in this embodiment and the binder can be between about 5% and about 50% by weight (which includes, but is not limited to 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50). In one embodiment, the base oil/binder composition is applied as a sub-base to the soil, and on top of the sub-base, a surface course is applied, which is a combination of the base oil/binder composition and synthetic fibers. This combination of the sub-base and the surface course allows for strong impact resistance in the soil.

In another embodiment, base oil is combined with a pour point depressant and a thermoplastic polyolefin compound including: polyisobutylene, polyethylene, polypropylene, polybutenes, polyisoprene, and their copolymers. In another embodiment, the base oil can be combined with the polyisobutylene without the pour point depressant. It is also to be understood that a binder can be added to any of the embodiments as well. In yet another embodiment, base oil is combined with pitch. In all of the above embodiments, the base oil can be synthetic isoalkane, having an unsaturated hydrocarbon content of less than 1%, a saturate percentage of greater than 99% (although it is to be understood that the saturate percentage can also be 90, 91, 92, 93, 94, 95, 96, 97, 98, or 99%), is either a synthetic or semi-synthetic hydrocarbon, is either a hydrotreated synthetic isoalkane, a hydrocracked synthetic isoalkane, or a hydroisomerized synthetic isoalkane, has a viscosity of at least about 19 centistokes @ 68° F. (20° C.), a flame point greater than about 266° C. (130° C.), and has a flash point of about 350° F. (177° C.). The base oil combined with polyisobutylene helps give even distribution of the load.

In another embodiment, base oil is combined with synthetic fibers. In this embodiment, the fibers are made of polypropylene, and are between about one inch and about three inches in length, with a tensile strength of about 40,000 psi (2,758 bar), a tensile elongation of about 20%, a Young's Modulus of about 600,000 psi (41,368 bar), and a specific gravity of about 0.91 gr/cm$^3$. In one embodiment, the fibers have carbon black added as UV protection. Typically, there are three types of fibers: standard tape fibers, fibrillated fibers, and decomposing fibers. In this embodiment, the fibers are added at about 0.15 pounds per square foot (0.072 millibar)-blended uniformly to about 6 inch depth and compacted. It is to be understood that this embodiment could also include a pour point depressant, a binder, and/or polyisobutylene.

There are five specific categories of base oils. These categories define the type of base stock the oil is formulated from. The categories are as follows. Note that the base oil group category is followed by the manufacturing method (in bold print) and then a description of the oil characteristics for each category.

Group I—Solvent Freezing: Group 1 base oils are the least refined of all the groups. They are usually a mix of different hydrocarbon chains with little or no uniformity. While some automotive oils on the market use Group 1 stocks, they are generally used in less demanding applications.

Group II—Hydro processing and Refining: Group II base oils are common in mineral based motor oils currently available on the market. They have fair to good performance in lubricating properties such as volatility, oxidative stability and flash/fire points. They have only fair performance in areas such as pour point, cold crank viscosity and extreme pressure wear.

Group—III Hydro processing and Refining: Group III base oils are subjected to the highest level of mineral oil refining of the base oil groups. Although they are not chemically engineered, they offer good performance in a wide range of attributes as well as good molecular uniformity and stability. They are commonly mixed with additives and marketed as synthetic or semi-synthetic products. Group III base oils have become more common in America in the last decade.

Group IV—Chemical Reactions: Group IV base oils are chemically engineered synthetic base stocks. Polyalphaolefins (PAOs) are a common example of a synthetic base stock. Synthetics, when combined with additives, offer excellent performance over a wide range of lubricating properties. They have very stable chemical compositions and highly uniform molecular chains. Group IV base oils are becoming more common in synthetic and synthetic-blend products for automotive and industrial applications.

Group V—As Indicated: Group V base oils are used primarily in the creation of oil additives. Esters and polyesters are both common Group V base oils used in the formulation of oil additives. Group V oils are generally not used as base oils themselves, but add beneficial properties to other base oils.

In some embodiments, the invention consists of aliphatic and cyclic organic compositions utilized as plasticizers and carriers that are blended with materials composed primarily of carboxylic acids and applied in a manner to produce improved levels of dust and erosion control, and soil improvement (by soil improvement it is meant the integration of fines preservation, dust control, erosion control, soil stabilization, strength gain, and/or increased load bearing capacity).

A novel and unexpected result occurs when carboxylic acids are blended with aliphatic or cyclic organic plasticizers and carriers. These blends are processed into either heterogeneous mixtures or emulsions that applied to soil, aggregate, or mineral provide high levels of long lasting dust control and stabilization. The invention exhibits tremendous moisture resistance, reworkability, working life, while being noncorrosive and nonhazardous.

Aliphatic organic compositions refers to saturated and unsaturated hydrocarbons derived from petroleum, coal, or synthetic manufacturing including paraffins or alkanes, olefins, alkenes, and alkadienes. Alcohols, ethers, aldehydes, ketones, carboxylic acids, and carbohydrates. The invention, in some embodiments, is comprised of 0% to 95% by weight (which includes, but is not limited to 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) of these compositions.

Cyclic organic compositions refer to alicyclic hydrocarbons, cycloparaffins, cycloolefins, cycloacetylenes, aromatic hydrocarbons, heterocyclics, and any combinations of aliphatic and cyclic structures such as terpenes, amino acids, proteins and nucleic acids. The invention, in some embodiments, is comprised of 0% to 95% by weight (which includes, but is not limited to 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) of these compositions.

Carboxylic acid refers to any substance whose major constituents are saturated or unsaturated fatty acids and their esters derived from animal or vegetable fat or oil; and vegetable derived resins or rosin acids, all represented chemically R—COOH. The invention is comprised 5% to 70% by weight (which includes, but is not limited to 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70) of these substances.

Plasticizer refers to organic compositions added to carboxylic acids to facilitate processing and increase the flexibility and durability of the final product.

Carrier refers to any organic compositions in which carboxylic acids are miscible in and serve as a vehicle to aid in the dispersion and penetration of plasticized carboxylic acids into the soil.

Heterogeneous mixtures refer to mixtures or solutions comprised of two or more substances, whether or not they are uniformly dispersed.

Emulsions refer to mixtures of two or more immiscible liquids held in suspension by small percentages of emulsifiers. Emulsifiers can be protein or carbohydrate polymers or long-chained alcohols and fatty acids. The emulsions can either be oil-in-water or water-in-oil continuous phase mixtures.

The invention is manufactured using conventional manufacturing equipment. Conventional mixers, emulsifiers, or colloid mills are utilized to blend these components into stable heterogeneous mixers or emulsions.

Application of the chemical agent to the soil is also accomplished by the use of conventional spray equipment. The agent is gravity fed or pumped through hoses, spray nozzles, or fixed sprayers and evenly applied to the soil or material to be treated. Motor-graders, asphalt grinders, mixers, pug mills, compactors, rollers, and other conventional construction equipment may be utilized to blend, set grade, and compact stabilized base if desired.

Once applied the liquid penetrates into the soil where two mechanisms for dust control and stabilization contribute to the effect. The first is a particle weighting and loading mechanism achieved through the processes of adsorption, adherence of molecules to the surface of particles and absorption, penetration of the substance into the inner structure of the particles.

The second mechanism is produced by the plasticized higher polymeric carboxylic acids which act as binders, in the embodiments in which binders are incorporated. The fatty acids and resins bind particles into a tightly cohesive base when subjected to compactive forces. The plasticized fatty acids and resins remain active even through severe wet weather and mechanical disturbances from heavy tracked vehicles and steel-chained tires. Our invention displays a unique and unexpected ability to be recompacted into a tightly cohesive base when disturbed, dramatically extending the working life of the chemical agents. In embodiments using synthetic isoalkane, the isoalkane can provide both cohesive and adhesive effects. In embodiments with esters, the ester can provide both cohesive and adhesive effects.

In some of the embodiments, the composition consists of aliphatic and cyclic organic compositions utilized as plasticizers and carriers that are blended with materials composed primarily of thermoplastic polyolefin compositions and applied in a manner to produce improved levels of dust and erosion control, and soil stabilization.

A novel and unexpected result occurs when polyolefin compositions are blended with aliphatic or cyclic organic plasticizers and carriers. These blends are processed into either heterogeneous mixtures or emulsions that applied to soil, aggregate, or mineral provide high levels of long lasting dust control and stabilization. The invention exhibits tremendous moisture resistance, reworkability, working life, while being noncorrosive and nonhazardous.

Thermoplastic polyolefin composition refers to any substance derived from olefins with chemical structure $C_nH_{2n}$ or $R-C_{2n}H_{3n}$, including polyethylene, polypropylene, polybutenes, polyisobutylenes, polyisoprene, and their copolymers. The invention, in some embodiments, is comprised of 2% to 90% by weight (which includes, but is not limited to 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90) of these substances.

In another embodiment, a synthetic isoalkane and binder are added to in situ sand with another sand/soil mixture at 10% of the mix. The 10% sand/soil mixture in this embodiment is a fine material passing a 60 sieve. In one example, the dry material was treated with water and EK35 (available from Midwest Industrial Supply of Canton, Ohio) to a moisture of approximately 7%. The EK35 was added at an application rate of one gallon per twelve square feet. The control gave a result of 10%, whereas at 0.1 penetration the result was 71.3% and at 0.2 penetration the result was 114.4%. It is to be understood that the sand/soil mixture can be between about 1% to about 15% of the mix by weight, which includes, but is not limited to, 1, 2, 3, 4, 5, 6, 7, 8, 9, 10, 11, 12, 13, 14, and 15. It is also to be understood that the fine material of the sand/soil mixture can have a sieve range between about 4 to about 200, which includes, but is not limited to, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, and 200.

In at least one embodiment, the fluid/fiber system works well with poor materials (i.e. minimal soil confinement, support, and weather). The improved soil could support and sustain high pressures for years with the worst soil and site conditions.

Accordingly, it can be seen that we have provided a unique and effective means of soil improvement using a chemical agent that provided unexpected results when tested. In one embodiment, the CBR of the marginal soils was only slightly increased by the introduction of the present invention. However, the treated soil was demonstrated to have significantly increased weight-bearing properties, despite the relatively low CBR value. This result is surprising in that CBR values are associated with weight-bearing properties, so excellent weight-bearing properties for a soil with a relatively low CBR value is unexpected. A marginal soil is defined as a soil that typically will not compact sufficiently to develop the bearing strength for its indented use. This is often due to particle shapes that will not facilitate the interlocking of particles or a particle distribution that prevents coherence between particles (e.g., insufficient fines, <5%, or too much fines, >30%). Marginal soils are often found locally to a construction site, making their potential use economically attractive. The present invention supplements the particle interlocking and cohesion of a compacted soil. Interlocking is supplemented when the ends of fibers are pinched between pairs of adjacent particles effecting mechanical reinforcement. Cohesion is supplemented when the fluid enhances compaction and capillary action between particles. The application of the present invention to a marginal soil improves its bearing capacity via the actions just described, enabling an economical material alternative with sufficient performance for the intended use.

In a separate embodiment from the previous definition of "synthetic," the definition of "synthetic" includes the fluid meeting the EPA static sheen requirement, the sediment requirement, the polyaromatic hydrocarbon requirement, and the toxicity requirements.

In one embodiment, wherein the synthetic fluid is a synthetic isoalkane, the synthetic isoalkane acts as a plasticizer, and the synthetic isoalkane is the only plasticizer. It is to be understood that this is merely one embodiment of the invention, however. In another embodiment of the invention, which can be combined with other embodiments, the composition is essentially devoid of hydrocarbons. In one embodiment, the synthetic isoalkane has a saturate percentage greater than 99%.

In another embodiment, the composition consists essentially of a synthetic fluid and a pour point depressant. In another embodiment the composition consists essentially of a synthetic fluid and a binder. In another embodiment the composition consists essentially of a synthetic fluid, a biodegradable material, and synthetic fibers. In another embodiment the composition consists essentially of a base oil and polyisobutylene. In another embodiment the composition consists essentially of a base oil and synthetic fibers.

Example

In many of Alaska's unstable soils, simply building a staging pad in an oil exploration camp can present significant challenges. In remote locations of the North Slope, where adequate materials are nonexistent or cost-prohibitive to import, the present invention has proven itself to be a cost-effective solution for soil stabilization. About 47 miles east of Barrow, Ak., the U.S.'s farthest north city, lies Cape Simpson—a former Defense Early Warning (DEW) site, is now a staging area for oil exploration. The Ukpeaġvik Iñupiat Corporation was faced with a real challenge. They had to reinforce and stabilize 180,000 square feet of material—washed and well-rounded beach sand. The solution must support heavy equipment by having 150,000 lb. wheel loads or higher. Without stabilization, a standard, unloaded pickup truck would sink to its front axle before its rear wheels were on the pad. Also the solution must work in sub-zero temps, require a minimum of installation equipment, and meet U.S. EPA and Alaska environmental standards. A combination of proven technologies from other applications was selected, synthetic fibers and synthetic fluid with binder (Midwest SF2). The geo-fiber is a polypropylene fiber that when blended into soil offers mechanical reinforcement, often used for slope repair and slope construction. It is also used in the sports industry to reinforce grass football fields. Nontoxic synthetic fluid with binder is used in gravel roads to provide continuous compaction and strength gain through cohesion and adhesion. The initial step was to apply the synthetic binder with a tracked vehicle. Lack of surface bearing made wheeled application impractical. Step two consisted of bags of geo fibers being strategically placed on the pad and broadcast by hand. A front-end loader with a tiller attachment blended the geo-fibers into the top several inches of soil to complete the third step in the process. The fourth step was another application of the synthetic fluid with binder, followed by the fifth and final step, compaction with a conventional, 13 ton, steel wheeled roller. The outcome was that the pad was capable of supporting 150,000 lb. wheel loads at a high frequency and much higher distributed stationary loads continuously. This outcome enabled uninterrupted Cape Simpson operations during the winter exploration season. During the summer, Midwest and the University of Alaska—Fairbanks visited the Cape Simpson site to determine the effectiveness of the SF2 installation. Over 100 surface strength measurements were made on the pad using 2 different ASTM standard test methods. The testing demonstrated that the strength of the SF2 stabilized surface was still twice that of unstabilized areas. According to the Ukpeaġvik Iñupiat Corporation, the surface strength was still more than sufficient to support uninterrupted camp operations. In situations where logistical challenges make traditional soil stabilization cost-prohibitive, SF2 is a very viable option. At Cape Simpson the pad was stabilized in three days for about $1.95 per square foot, many times cheaper and much faster than importing materials.

Although the description above contains much specificity, these should not be construed as limiting the scope of the invention but as merely providing illustrations of some of the presently preferred embodiments of this invention. Various other embodiments and ramifications are possible within its scope. For example, several different types of substances rich in polyolefins are available as drop-in replacements to those tested, as well as numerous a aliphatic and cyclic organic compositions.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The invention has been described with reference to several embodiments. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A method for providing soil improvement to a particulate surface soil, the method comprising the steps of:
applying to and allowing to penetrate the associated surface soil a composition comprising a synthetic fluid and a binder; and,
applying as a second surface a synthetic fluid, a binder, and synthetic fibers.

2. The method of claim 1, wherein the synthetic fluid is synthetic isoalkane and the binder is chosen from the group comprising: a carboxylic acid, an ester, polyisobutylene, and a thermoplastic polyolefin.

3. The method of claim 1, wherein the synthetic isoalkane allowed to penetrate the associated surface is about 50% to about 99.9% by weight.

4. The method of claim 1, wherein the synthetic fibers are polypropylene, are about one-quarter inch to about three inches in length, and are chosen from the group comprising standard tape fibers, fibrillated fibers, and decomposing fibers.

5. The method of claim 1, wherein the second surface further comprises an emulsifier.

6. The method of claim 1, wherein the synthetic fluid meets EPA standards for offshore drilling.

7. The method of claim 1, wherein the second surface further comprises a pour point depressant.

8. The method of claim 7, wherein the pour point depressant is chosen from the group comprising acrylic, acrylic copolymers, polymethacrylate, and polyalkylmetacrylate.

9. The method of claim 5, wherein the synthetic fluid is synthetic isoalkane and the binder is chosen from the group comprising: a carboxylic acid, an ester, polyisobutylene, and a thermoplastic polyolefin.

10. The method of claim 9, wherein the synthetic isoalkane allowed to penetrate the associated surface is about 98% to about 99.9% by weight.

11. The method of claim 10, wherein the synthetic fibers are polypropylene, are about one-quarter inch to about three inches in length, and are chosen from the group comprising standard tape fibers, fibrillated fibers, and decomposing fibers.

12. The method of claim 11, wherein the second surface further comprises a pour point depressant.

13. The method of claim 12, wherein the pour point depressant is chosen from the group comprising acrylic, acrylic copolymers, polymethacrylate, and polyalkylmetacrylate.

14. The method of claim 13, wherein the synthetic fluid meets EPA standards for offshore drilling.

15. The method of claim 7, wherein the synthetic fluid is synthetic isoalkane and the binder is chosen from the group comprising: a carboxylic acid, an ester, polyisobutylene, and a thermoplastic polyolefin.

16. The method of claim 15, wherein the pour point depressant is chosen from the group comprising acrylic, acrylic copolymers, polymethacrylate, and polyalkylmetacrylate.

17. The method of claim 16, wherein the synthetic isoalkane allowed to penetrate the associated surface is about 80% to about 99.9% by weight.

18. The method of claim 17, wherein the synthetic fibers are polypropylene, are about one-quarter inch to about three inches in length, and are chosen from the group comprising standard tape fibers, fibrillated fibers, and decomposing fibers.

19. The method of claim 18, wherein the synthetic fluid meets EPA standards for offshore drilling.

20. A method for providing soil improvement to a particulate surface soil, the method comprising the steps of:
applying to and allowing to penetrate the associated surface soil a composition comprising about 98% to about 99.9% by weight synthetic isoalkane and a binder, wherein the binder is chose from the group comprising: a carboxylic acid, an ester, polyisobutylene, and a thermoplastic polyolefin; and,
applying as a second surface synthetic isoalkane, an emulsifier, a pour point depressant, a binder, and synthetic fibers, wherein the synthetic fibers are polypropylene, are about one-quarter inch to about three inches in length, and are chosen from the group comprising standard tape fibers, fibrillated fibers, and decomposing fibers, wherein the pour point depressant is chosen from the group comprising acrylic, acrylic copolymers, polymethacrylate, and polyalkylmetacrylate.

* * * * *